(12) United States Patent
Yamamoto et al.

(10) Patent No.: US 8,857,852 B2
(45) Date of Patent: Oct. 14, 2014

(54) BEAM MEMBER

(75) Inventors: Eiji Yamamoto, Haga-gun (JP);
Masamitsu Iino, Haga-gun (JP);
Takayuki Owada, Kuki (JP)

(73) Assignee: F-Tech Inc., Kita (JP)

( * ) Notice: Subject to any disclaimer, the term of this patent is extended or adjusted under 35 U.S.C. 154(b) by 0 days.

(21) Appl. No.: 14/113,184

(22) PCT Filed: Jun. 6, 2012

(86) PCT No.: PCT/JP2012/064552
§ 371 (c)(1),
(2), (4) Date: Oct. 21, 2013

(87) PCT Pub. No.: WO2012/169525
PCT Pub. Date: Dec. 13, 2012

(65) Prior Publication Data
US 2014/0049030 A1 Feb. 20, 2014

(30) Foreign Application Priority Data
Jun. 7, 2011 (JP) .................. 2011-127360

(51) Int. Cl.
*B62D 21/00* (2006.01)
*B62D 21/15* (2006.01)
*B62D 21/02* (2006.01)
*B21D 22/02* (2006.01)

(52) U.S. Cl.
CPC .............. *B62D 21/02* (2013.01); *B62D 21/157* (2013.01); *B21D 22/025* (2013.01)
USPC .............................. 280/781; 138/170; 52/834

(58) Field of Classification Search
CPC .............. E04B 1/18; E04B 2/78; E04C 3/00; B21D 22/025; B21D 22/02; B62D 21/02
USPC .................... 52/834, 835, 843, 848; 280/781; 124/71, 72; 454/121; 138/170, 171
See application file for complete search history.

(56) References Cited

U.S. PATENT DOCUMENTS 3,936,206 A * 2/1976 Meisberger .................. 403/334
(Continued)

FOREIGN PATENT DOCUMENTS

| DE | 10151768 A1 | 4/2003 |
|----|----|----|
| DE | 10151768 B4 | 8/2005 |
| DE | 102006043030 A1 | 3/2007 |
| EP | 1304281 A2 | 4/2003 |
| EP | 1304281 B1 | 6/2006 |
| ES | 2261566 T3 | 11/2006 |

(Continued)

OTHER PUBLICATIONS

International Search Report dated Aug. 14, 2012, issued in corresponding application No. PCT/JP2012/064552.

*Primary Examiner* — Charles A. Fox
*Assistant Examiner* — Patrick Maestri
(74) *Attorney, Agent, or Firm* — Westerman, Hattori, Daniels & Adrian, LLP

(57) ABSTRACT

In a beam member having a cylindrical beam main body with a first end portion and a second end portion in which respective end surfaces oppose and partially abut to each other in a circumferential direction of the beam main body to define a slit portion, a bracket member straddles the first end portion and the second end in the circumferential direction to be welded to an outer surface of the beam main body so as to cover the slit portion between a first welding portion and a second welding portion that weld abutting portions of the respective end surfaces of the first end portion and the second end portion.

10 Claims, 8 Drawing Sheets

(56) References Cited

U.S. PATENT DOCUMENTS

| | | | |
|---|---|---|---|
| 5,722,463 A * | 3/1998 | Smyth et al. | 138/170 |
| 6,666,500 B2 | 12/2003 | Polzer et al. | |
| 7,959,778 B2 | 6/2011 | Inagaki et al. | |
| 8,631,626 B2 * | 1/2014 | Ballantine | 52/704 |
| 2003/0085590 A1 | 5/2003 | Polzer et al. | |
| 2003/0126827 A1 * | 7/2003 | Davis | 52/731.2 |
| 2007/0056860 A1 | 3/2007 | Inagaki et al. | |

FOREIGN PATENT DOCUMENTS

| | | |
|---|---|---|
| JP | 07-117710 A | 5/1995 |
| JP | 09-086192 A | 3/1997 |
| JP | 3070359 B2 | 7/2000 |
| JP | 2003-137130 A | 5/2003 |
| JP | 2004-255891 A | 9/2004 |
| JP | 3769528 B2 | 4/2006 |
| JP | 2011-104603 A | 6/2011 |

* cited by examiner

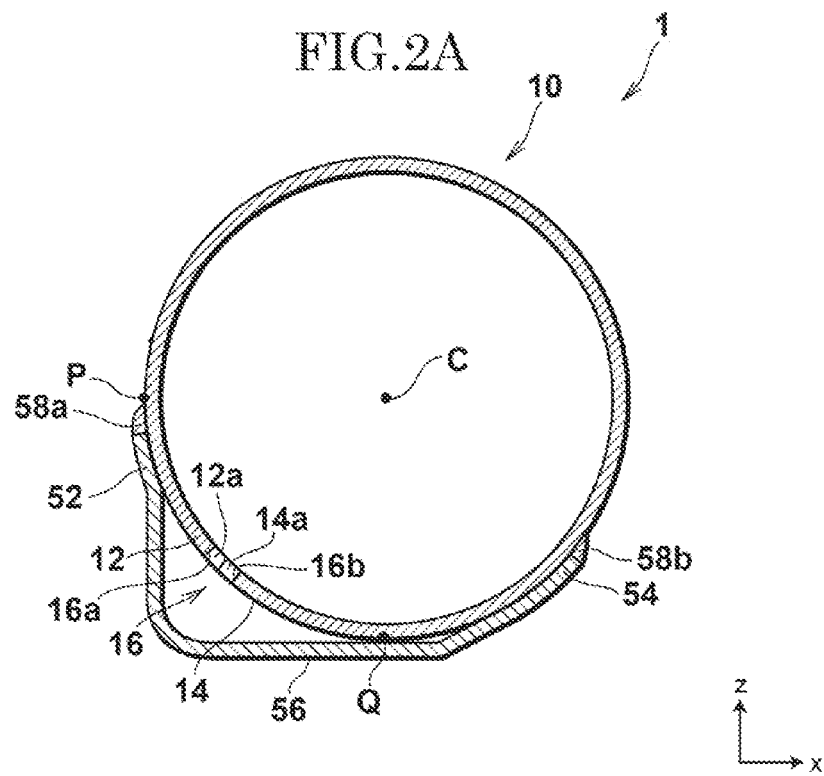
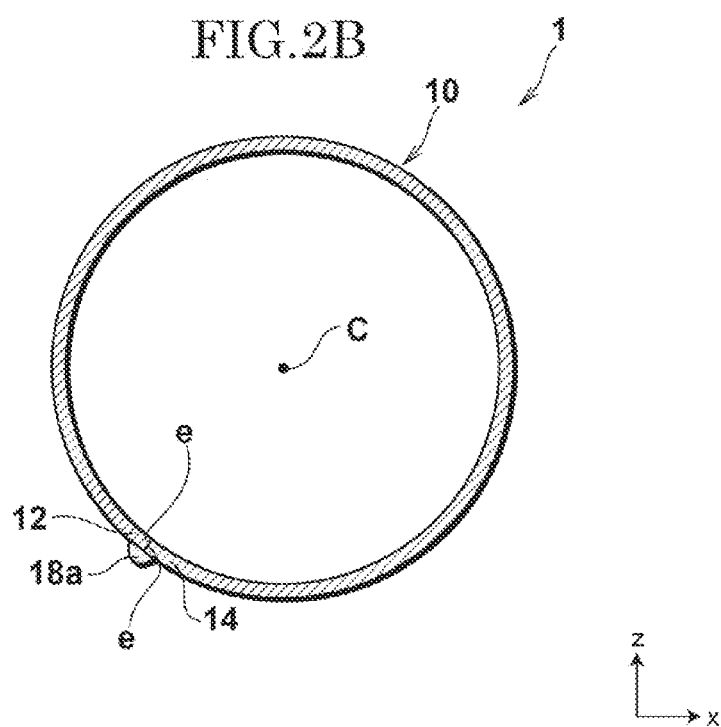

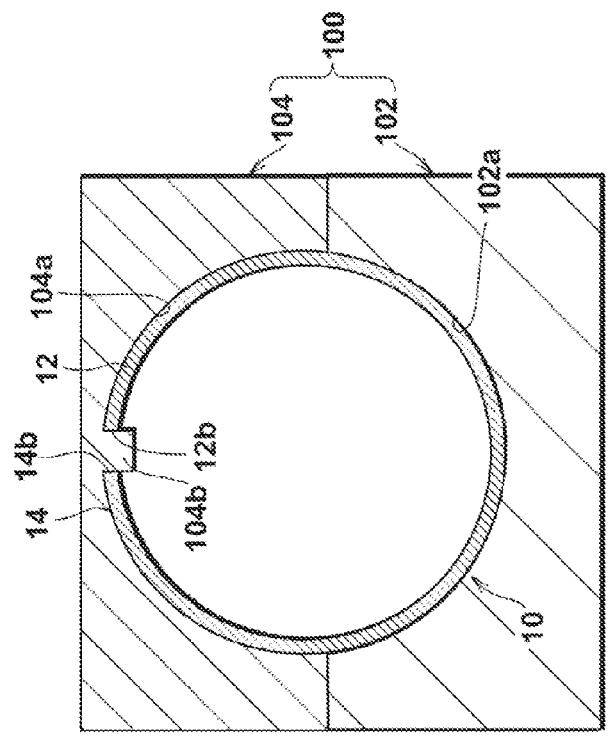
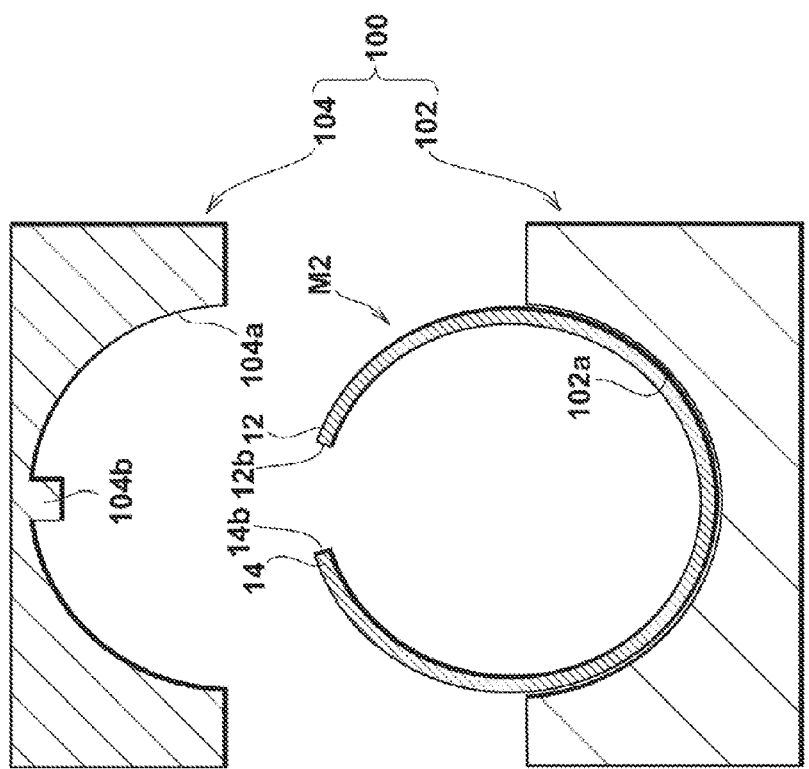

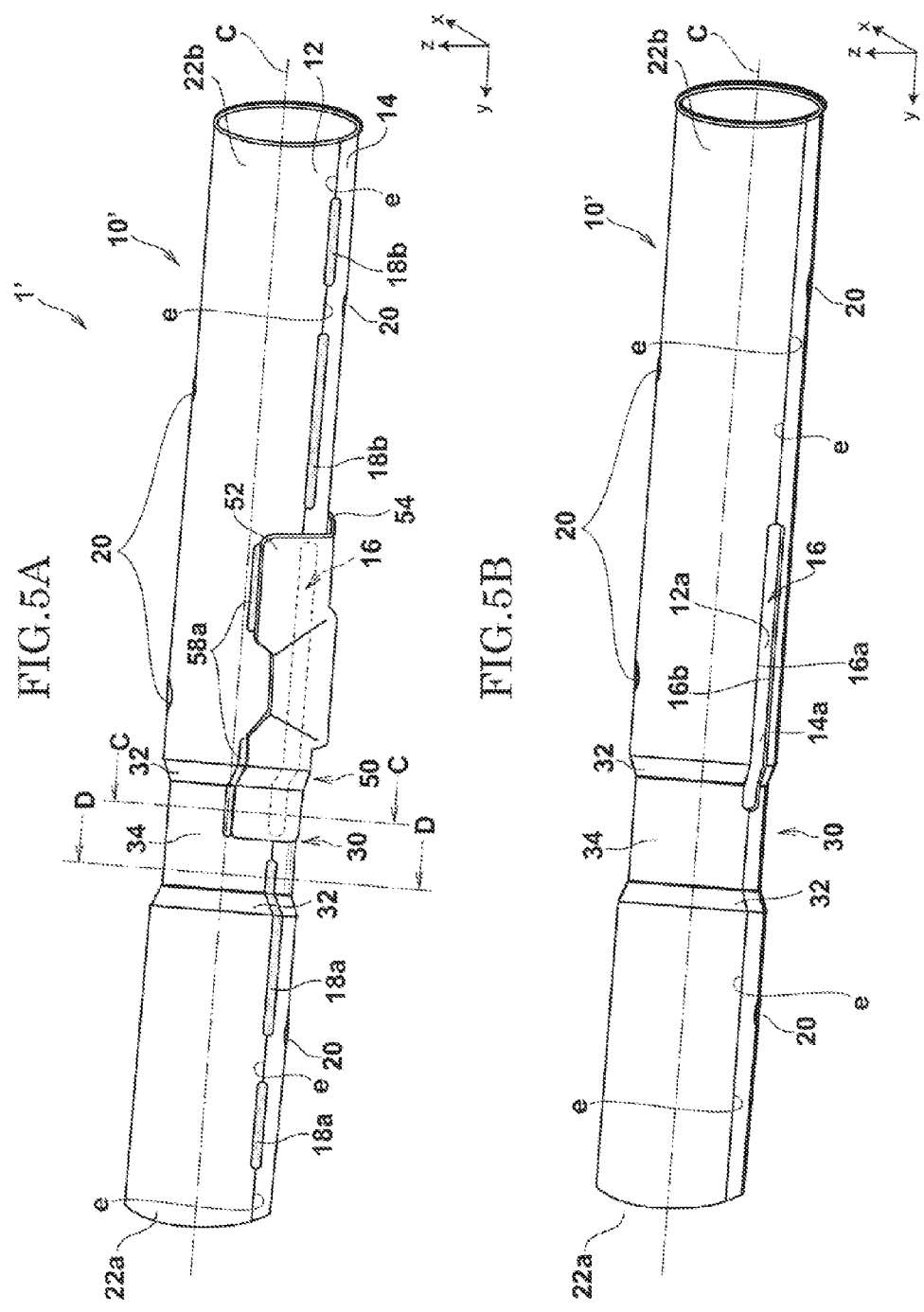

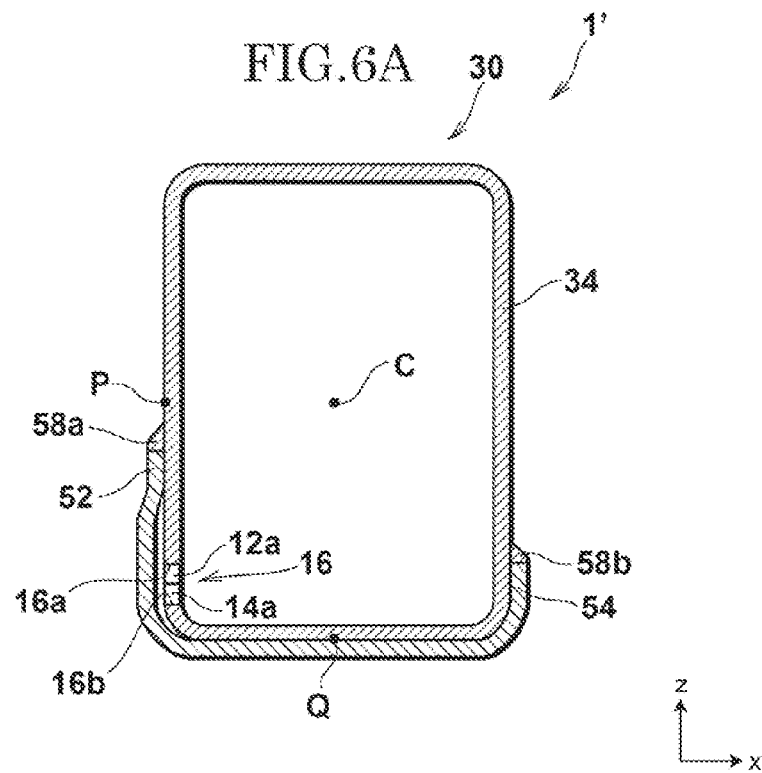
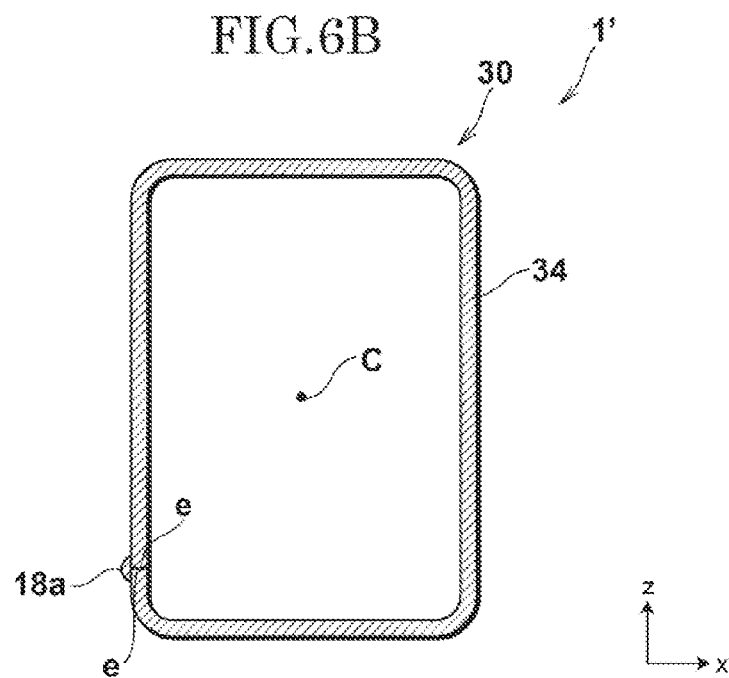

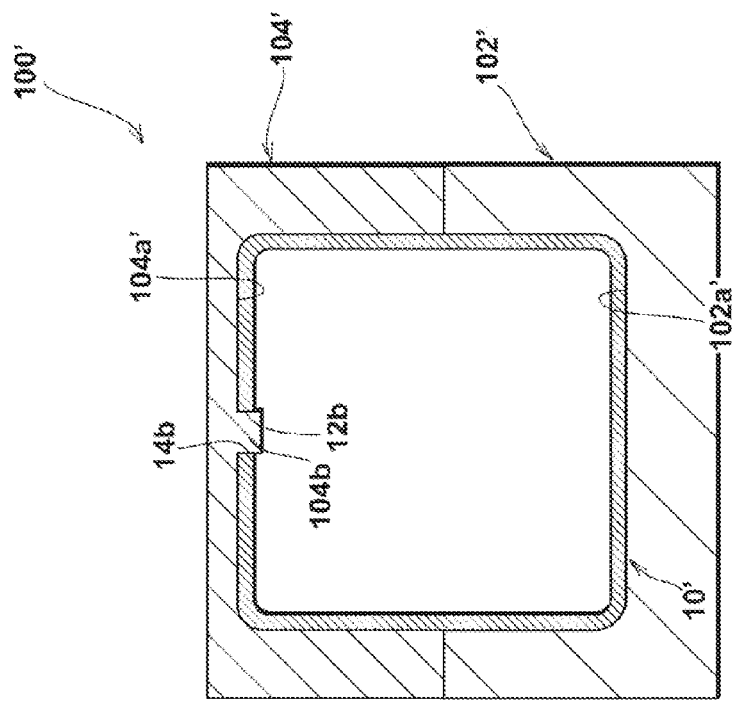
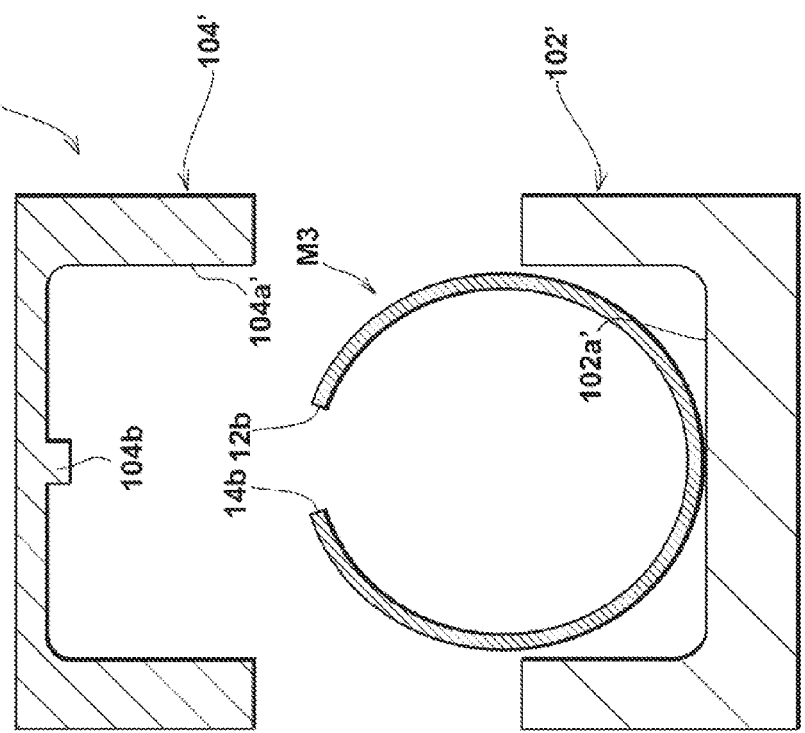

BEAM MEMBER

TECHNICAL FIELD

The present invention relates to a beam member, and more particularly relates to a beam member that can be used for a strength member of a vehicle such as an automobile.

BACKGROUND ART

In recent years, a part of an engine/mission mount system or a suspension system in a vehicle such as an automobile has been usually attached to a sub-frame that is constituted by a plurality of beam members and has desired strength and rigidity to intend precise positioning thereof and an improvement in sound vibration characteristics.

It has been required that such a sub-frame has high design flexibility according to the type and specifications of a vehicle and achieves further weight reduction and further cost reduction while keeping the basic functions.

In such a state, Patent Document 1 discloses a sub-frame 11 that includes a U-shaped pipe member 12 and a connecting pipe member 15 and has a power unit 6 incorporated therein.

Patent Document 2 discloses a manufacturing method of a side member 40 in which one end portion and the other end portion of a steel plate 50 serving as a material in a widthwise direction are bent to oppose to each other, thereby forming flanges 46a and 46b, a boundary portion 56 between a portion to be a bottom wall 44 and a portion to be a sidewall 48 is then bent, and an overlapping portion of the flanges 46a and 46b is fixed by a weld 49.

PRIOR ART DOCUMENT

Patent Documents

Patent Document 1: Japanese Patent Application Laid-open Publication No. H9-86192
Patent Document 2: Japanese Patent Application Laid-open Publication No. 2004-255891

SUMMARY OF THE INVENTION

Problem to be Solved by the Invention

However, according to the study of the present inventors, while Patent Document 1 realizes the sub-frame 11 that has desired strength and rigidity while achieving weight reduction by using the U-shaped pipe member 12 and the connecting pipe member 15, because these pipe members need to be bought from pipe member manufacturers, it tends to be difficult to quickly obtain a pipe member having the size and shape suitable for the type and specifications of a vehicle and such a pipe member tends to be relatively expensive. Further, because such a pipe member is continuously subjected to seam welding over the entire length in an axial direction thereof, a welding step itself is complicated and to attach other components such as a bracket member to the pipe member, a separate step of welding these components to the pipe member needs to be added after the pipe member is completed. That is, it has been required for such a pipe member to simplify an attachment step of other components while design flexibility is increased and to achieve further weight reduction and further cost reduction.

In Patent Document 2, while the side member 40 is manufactured from one steel plate 50 serving as a material, the side member 40 having a rectangular cross-section is merely disclosed specifically. There is no disclosure or suggestion of a specific step of manufacturing the side member 40 that has a cylindrical cross-section such as a circular cross-section that can set the size to be compact to prevent interference with peripheral components while required strength is secured and a rectangular cross-section that can provide the shape and size of preventing interference with peripheral components with high design flexibility and shape precision. Because the overlapping portion of the flanges 46a and 46b is fixed by the weld 49, it is conceivable that not only the overlapping portion of the flanges 46a and 46b increases the weight of the side member 40 and but also externally extends, so that the layout of peripheral components needs to be examined again. Further, there is no disclosure or suggestion of a specific step of attaching other components such as a bracket member to the side member 40 while fixing the overlapping portion of the flanges 46a and 46b by the weld 49.

At present, it has been expected to realize a new configuration that can manufacture a beam member serving as a strength member from a plate-shaped member with high shape precision in a mode that an attachment step of other components can be simplified while design flexibility is increased and further weight reduction and further cost reduction can be achieved.

The present invention has been achieved in view of the above problems, and an object of the present invention is to provide a beam member serving as a strength member that can achieve further weight reduction and further cost reduction with high shape precision while simplifying an attachment step of other components while design flexibility is increased.

Means for Solving the Problem

To achieve the above object, a first aspect of the present invention is to provide a beam member comprising: cylindrical beam main body that is formed by rolling a plate-shaped member; a first end portion and a second end portion of the beam main body in which respective end surfaces oppose and partially abut to each other in a circumferential direction of the beam main body; a slit portion of the beam main body that is formed by causing the first end portion and the second end portion to be spaced away from each other in the circumferential direction at a central portion of the beam main body in an axial direction of the beam main body; a first welding portion and a second welding portion of the beam main body that weld abutting portions of the respective end surfaces of the first end portion and the second end portion to each other so as to sandwich the slit portion therebetween in the axial direction; and a bracket member that straddles the first end portion and the second end portion in the circumferential direction to be welded to an outer surface of the beam main body so as to cover the slit portion between the first welding portion and the second welding portion in the axial direction.

According to a second aspect of the present invention, in addition to the first aspect, the slit portion is defined by causing a first half-slit portion that is formed at the first end portion to cooperate with a second half-slit portion that is formed at the second end portion and has a size equal to that of the first half-slit portion.

According to a third aspect of the present invention, in addition to the second aspect, the first half-slit portion and the second half-slit portion are formed together in the plate-shaped member before the plate-shaped member is rolled.

According to a fourth aspect of the present invention, in addition to any of the first to third aspects, the bracket member covers entirely the slit portion.

According to a fifth aspect of the present invention, in addition to any of the first to fourth aspects, the beam member further comprises a plurality of holes, wherein the holes are formed together in the plate-shaped member before the plate-shaped member is rolled.

Effect of the Invention

According to the configuration of the first aspect of the present invention, the present invention comprises the slit portion that is defined by causing the first end portion and the second end portion opposing to each other in the circumferential direction of the cylindrical beam main body formed by rolling a plate-shaped member to be spaced away from each other at a central portion of the beam main body in an axial direction thereof, the first welding portion and the second welding portion that weld abutting portions of the respective end surfaces of the first end portion and the second end portion to each other so as to sandwich the slit portion therebetween in the axial direction of the beam main body, and the bracket member that is a strength member that extends across the first end portion and the second end portion to be welded to an outer surface of the beam main body so as to cover the slit portion between the first welding portion and the second welding portion in the axial direction of the beam main body. Accordingly, it is possible to provide the beam member serving as a strength member that can achieve further weight reduction and further cost reduction with high shape precision while simplifying an attachment step of other components while design flexibility is increased.

According to the configuration of the second aspect of the present invention, the slit portion is defined by causing the first half-slit portion that is formed at the first end portion to cooperate with the second half-slit portion that is formed at the second end portion and has the size equal to that of the first half-slit portion. Accordingly, it is possible to suppress unnecessary stress concentration in the beam main body and to secure the strength of the beam main body. By suppressing unnecessary deformation when the cylindrical beam main body is molded by rolling a plate-shaped member, it is possible to provide the beam main body with high shape precision.

According to the configuration of the third aspect of the present invention, the first half-slit portion and the second half-slit portion are formed in a plate-shaped member before the plate-shaped member is rolled. Accordingly, the respective end surfaces of the first half-slit portion and the second half-slit portion can be formed as a vertical surface with high shape precision. While unnecessary deformation is suppressed when the cylindrical beam main body is molded by rolling a plate-shaped member, the plate-shaped member that is being rolled shows desired plastic deformation, so that the beam main body with high shape precision can be provided.

According to the configuration of the fourth aspect of the present invention, the bracket member covers entirely the slit portion while being spaced apart from the slit portion. Accordingly, it is possible to effectively prevent foreign matters from entering in the beam main body while entering of a paint into the beam main body is permitted.

According to the configuration of the fifth aspect of the present invention, a plurality of holes formed in the beam main body are formed before the plate-shaped member is rolled. Accordingly, holes without any unnecessary burr or deformation can be provided with high shape precision. Further, mounting of other members on the beam main body, entering of a paint into the beam main body, draining, and the like can be successfully realized.

BRIEF DESCRIPTION OF THE DRAWINGS

FIG. 2A is a cross-sectional diagram along A-A of FIG. 1A.

FIG. 2B is a cross-sectional diagram along B-B of FIG. 1A.

FIG. 4A is a cross-sectional diagram in which a lower die and an upper die are open at a final step of molding the beam main body of the beam member according to the embodiment.

FIG. 4B is a cross-sectional diagram in which the lower die and the upper die are closed at the final step shown in FIG. 4A.

FIG. 5A is a perspective view of a beam member according to a modification of the embodiment.

FIG. 5B is a perspective view of a beam main body of the beam member according to the modification.

FIG. 6A is a cross-sectional diagram along C-C of FIG. 5A.

FIG. 6B is a cross-sectional diagram along D-D of FIG. 5A.

FIG. 7A is a cross-sectional diagram in which a lower die and an upper die are open at a final step of molding the beam main body of the beam member according to the modification.

FIG. 7B is a cross-sectional diagram in which the lower die and the upper die are closed at the final step shown in FIG. 7A.

EMBODIMENT FOR CARRYING OUT THE INVENTION

Figure 1A:
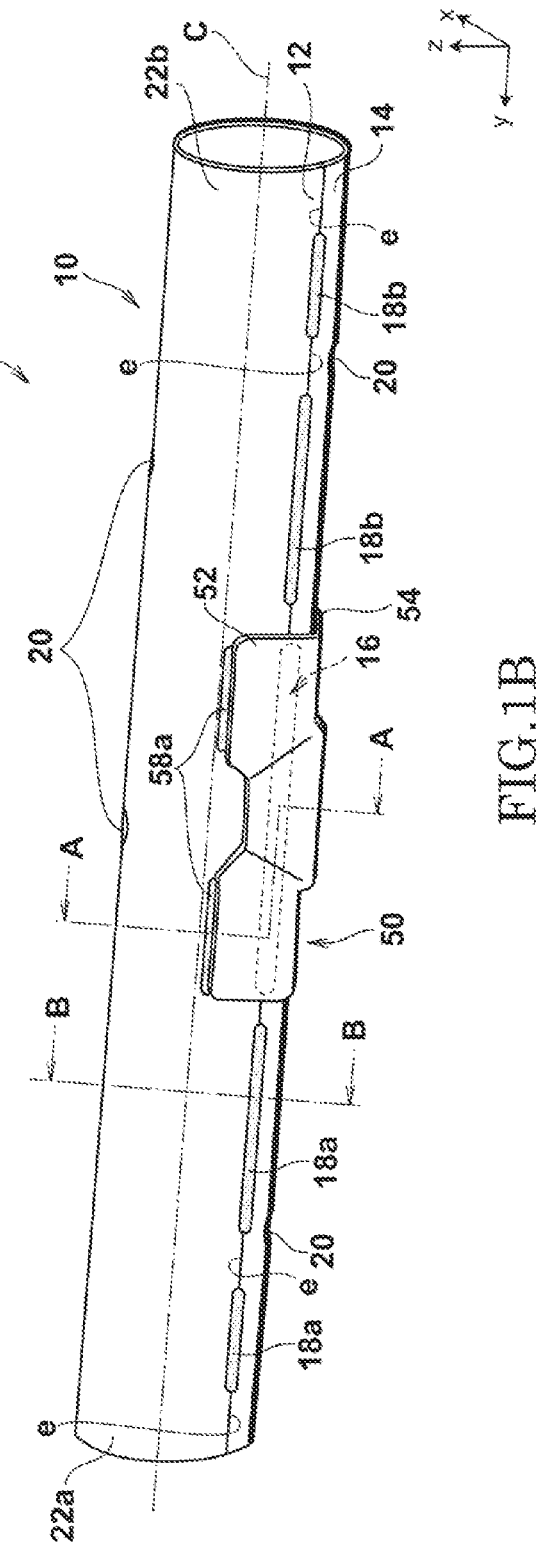
FIG. 1A is a perspective view of a beam member according to the embodiment.

A beam member according to an embodiment of the present invention will be explained below in detail with reference to the accompanying drawings where appropriate. In the drawings, an x-axis, a y-axis, and a z-axis constitute a three-axis orthogonal coordinate system. It is assumed that the positive direction of the x-axis is a front direction, the positive direction of the y-axis is a left direction, and the positive direction of the z-axis is an upward direction.

A configuration of the beam member according to the present embodiment is explained first in detail with reference to FIGS. 1A to 2B.

Figure 1B:
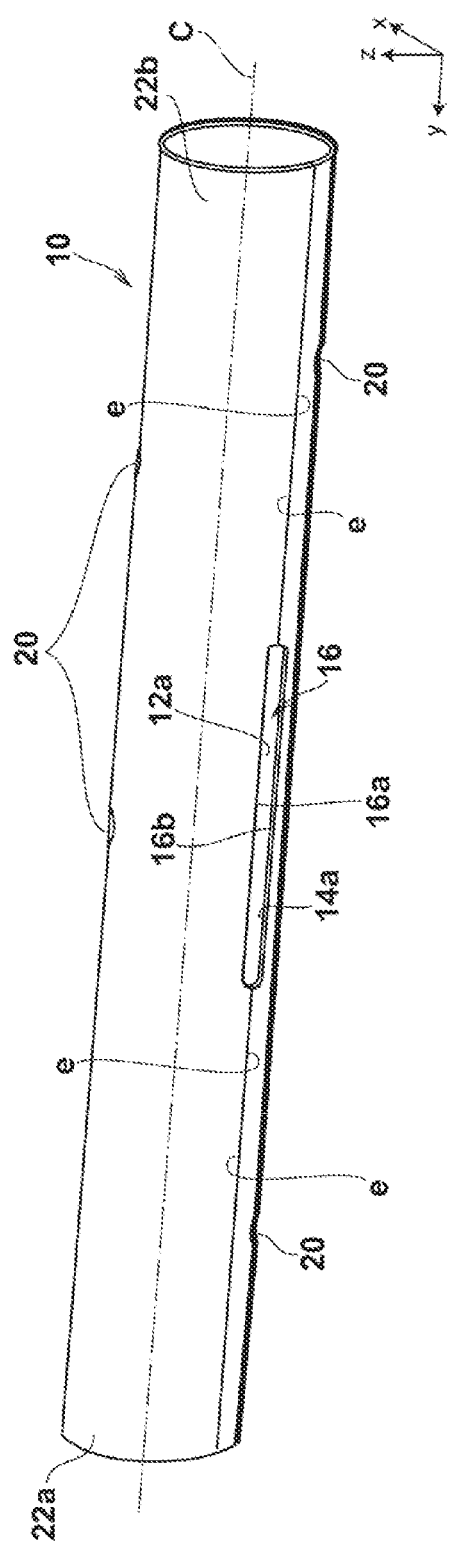
FIG. 1B is a perspective view of a beam main body of the beam member according to the embodiment.

FIG. 1A is a perspective view of a beam member according to the present embodiment. FIG. 1B is a perspective view of a beam main body of the beam member according to the present embodiment. FIG. 2A is a cross-sectional diagram along A-A of FIG. 1A and FIG. 2B is a cross-sectional diagram along B-B of FIG. 1A.

As shown in FIGS. 1A to 2B, a beam member 1 serving as a strength member includes a beam main body 10 that is typically cylindrical and has a central axis C in a right-and-left direction that is parallel to the y-axis and a bracket member 50 that is welded to the beam main body 10. Both of the beam main body 10 and the bracket member 50 are a strength member that is formed of metal such as iron or aluminum. The beam member 1 is typically applied as a constituent element of a sub-frame of an automobile.

Specifically, the beam main body 10 is molded by cylindrically rolling a plate-shaped member by pressing, and includes one end portion 12 and the other end portion 14 that extend in the right-and-left direction while opposing to each other in a circumferential direction thereof. The size of such a beam main body 10 is set to match that of a beam main body of a general round pipe. That is, the size of such a beam main body 10 can be set to achieve high flexibility according to the arrangement state of peripheral components and the like. When the beam main body 10 is replaced by an existing round pipe, the size of the beam main body 10 can be set to match that of the existing round pipe or to be smaller as long as there is no problem about a strength condition and the like.

A slit portion 16 that is a rectangular opening portion formed so that the one end portion 12 and the other end portion 14 are spaced away from each other in the circumferential direction of the beam main body 10 is formed at a central portion of the beam main body 10 in a direction of the central axis C thereof. The slit portion 16 is configured by causing a first half-slit portion 12a that is formed by cutting out the one end portion 12 to cooperate with a second half-slit portion 14a that is formed by cutting out the other end portion 14 and has the same size as that of the first half-slit portion 12a. Because such a slit portion 16 is provided, the weight of the beam main body 10 is reduced. Further, because the size of the first half-slit portion 12a is set to be equal to that of the second half-slit portion 14a, the strength of the beam main body 10 is equalized and unnecessary stress concentration in the beam main body 10 is suppressed.

On the other hand, remaining portions of the one end portion 12 and the other end portion 14 other than the slit portion 16 are welded to each other correspondingly by a first welding portion 18a and a second welding portion 18b while the respective end surfaces "e" and "e" abut to each other. That is, in the beam main body 10, the one end portion 12 and the other end portion 14 on the left side of the slit portion 16 are welded to each other by the first welding portion 18a, and the one end portion 12 and the other end portion 14 on the right side of the slit portion 16 are welded to each other by the second welding portion 18b. While these first welding portion 18a and second welding portion 18b are typically provided to be symmetric with respect to the slit portion 16, each of the first welding portion 18a and the second welding portion 18b can be a continuous welding portion or an intermittent welding portion. Because the first welding portion 18a and the second welding portion 18b having such a configuration are provided, the length of a welding portion that welds the one end portion 12 and the other end portion 14 is shortened, so that the cost of the beam main body 10 is reduced and the weight of the beam main body 10 is also reduced.

Further, a plurality of holes 20 are formed in the beam main body 10. These holes 20 include a mounting hole for mounting other bracket members and the like, a positioning hole, a paint introduction hole, a drain hole, and the like.

A left end portion 22a and a right end portion 22b of such a beam main body 10 are mounting end portions for mounting the beam main body 10 on other strength members. For example, when the beam member 1 is applied as a constituent element of a sub-frame of an automobile, the left end portion 22a and the right end portion 22b are fixed to a pair of side beam members via a welding portion and the like, so that the beam main body 10 is mounted on the pair of side beam members.

The position of the slit portion 16 in the beam main body 10 and the size thereof are set so that the beam main body 10 shows desired dynamic toughness to a predetermined load or moment applied thereto when the beam member 1 is used, while reduction in the strength and rigidity of the beam main body 10 due to the slit portion 16 is suppressed as much as possible. A distance between an upper-edge end surface 16a and a lower-edge end surface 16b in the slit portion 16 is set to be a distance without any mutual interference of the upper-edge end surfaces 16a and the lower-edge end surface 16b so that when the beam main body 10 is plastically deformed under the same dynamic condition, the upper-edge end surface 16a does not partially abut against the lower-edge end surface 16b.

The position of the first welding portion 18a and the second welding portion 18b in the remaining portion of the one end portion 12 and the other end portion 14 other than the slit portion 16 and the length thereof are also set so that the beam main body 10 having the slit portion 16 shows desired dynamic resistance under the same dynamic condition.

For example, the beam member 1 is applied as a constituent element of a sub-frame of an automobile, specifically, as a constituent element of a sub-frame having at least a part of an engine/mission mount system or a front suspension system placed therein, the slit portion 16 is typically set to be open diagonally toward the rear of the beam main body 10 while extending in the right-and-left direction thereof. Further, the upper-edge end surface 16a of the slit portion 16 is set to be lower than a line P at the rearmost position of the beam main body 10, and the lower-edge end surface 16b of the slit portion 16 is set to be higher than a line Q at the lowest position of the beam main body 10. In such a case, the one end portion 12 and the other end portion 14 also extend correspondingly in the right-and-left direction of the beam main body 10 at the diagonal rear thereof, and thus the first welding portion 18a and the second welding portion 18b also extend in the right-and-left direction of the beam main body 10 at the diagonal rear thereof.

The bracket member 50 is obtained by molding a plate-shaped member by pressing, and includes, in addition to a rear end portion 52 and a front end portion 54, a load receiving portion 56 formed between the rear end portion 52 and the front end portion 54. By matching the size and shape of the beam main body 10 to those of a beam main body of a general round pipe, a bracket member that is adaptable for the beam main body of the general round pipe can be used for the bracket member 50. To downsize the bracket member 50 and reduce the weight thereof, while it is preferable that the rear end portion 52 and the front end portion 54 are formed to be concave in the circumferential direction of the beam main body 10 at the right-and-left direction central portion thereof, the rear end portion 52 and the front end portion 54 can extend merely linearly.

Such a bracket member 50 is fixed to the beam main body 10 as follows. That is, while the bracket member 50 is spaced away from an outer surface of the beam main body 10 at the periphery of the slit portion 16, the rear end portion 52 is welded to the outer surface of the beam main body 10 by a rear welding portion 58a at the diagonal rear of the upper-edge end surface 16a of the slit portion 16. The front end portion 54 is welded to the outer surface of the beam main body 10 by a front welding portion 58b in diagonal front of the lower-edge end surface 16b of the slit portion 16.

The position where the bracket member 50 is fixed to the beam main body 10 and the shape thereof are set so that any interference does not occur, that is, the bracket member 50 does not contact the first welding portion 18a and the second welding portion 18b, and so that the bracket member 50 covers at least a part of the slit portion 16 while being fixed to the beam main body 10 by the rear welding portion 58a and the front welding portion 58b to extend across the slit portion 16 in an up-and-down direction. A configuration of such a bracket member 50 provides a function of reinforcing the strength and rigidity of the beam main body 10 that tend to be reduced because of the slit portion 16 is provided. At the same time, the rear welding portion 58a and the front welding portion 58b are provided at positions where no interference with the first welding portion 18a and the second welding portion 18b occurs in the beam main body 10. The rear welding portion 58a and the front welding portion 58b can be a continuous welding portion or an intermittent welding portion.

In view of the function of reinforcing the strength and rigidity of the beam main body 10, in principle, the bracket member 50 needs to be welded to the outer surface of the beam main body 10 at upper and lower peripheral portions of the slit portion 16 correspondingly by the rear welding portion 58a and the front welding portion 58b, while extending across the slit portion 16 in the up-and-down direction to cover at least a portion thereof. Further, in view of the function of reinforcing the strength and rigidity of the beam main body 10, it is preferable that the bracket member 50 is provided so as to have a right-and-left direction width equal to or longer than the right-and-left direction full width of the slit portion 16. It is preferable that the rear welding portion 58a and the front welding portion 58b are correspondingly provided so as to extend from the upper and lower peripheral portions of the slit portion 16 to terminate at right-and-left direction ends of the slit portion 16, or so as to have right-and-left direction ends that extend over the ends of the slit portion 16 in the right-and-left direction to terminate.

Because the bracket member 50 has a shape of covering at least a part of the slit portion 16, the bracket 50 suppresses entering of foreign matters via the slit portion 16 in the beam main body 10 during an automobile is travelling and the like. Meanwhile, the portion of the bracket member 50 covering the slit portion 16 is spaced away from the slit portion 16 and the bracket member 50 has a shape of being spaced away from the outer surface of the beam main body 10 also at the periphery of the slit portion 16, so that entering of a required paint into the beam main body 10 via the slit portion 16 is permitted.

For example, when the beam member 1 is applied as a constituent element of a sub-frame of an automobile, the bracket member 50 can be used as a jack-up bracket at the time of jacking up an automobile, and the load receiving portion 56 functions as a portion that receives the weight of an automobile.

Next, a manufacturing method of the beam member 1 having the configuration as explained above is explained in detail with reference to FIGS. 3 to 4B.

Figure 3:
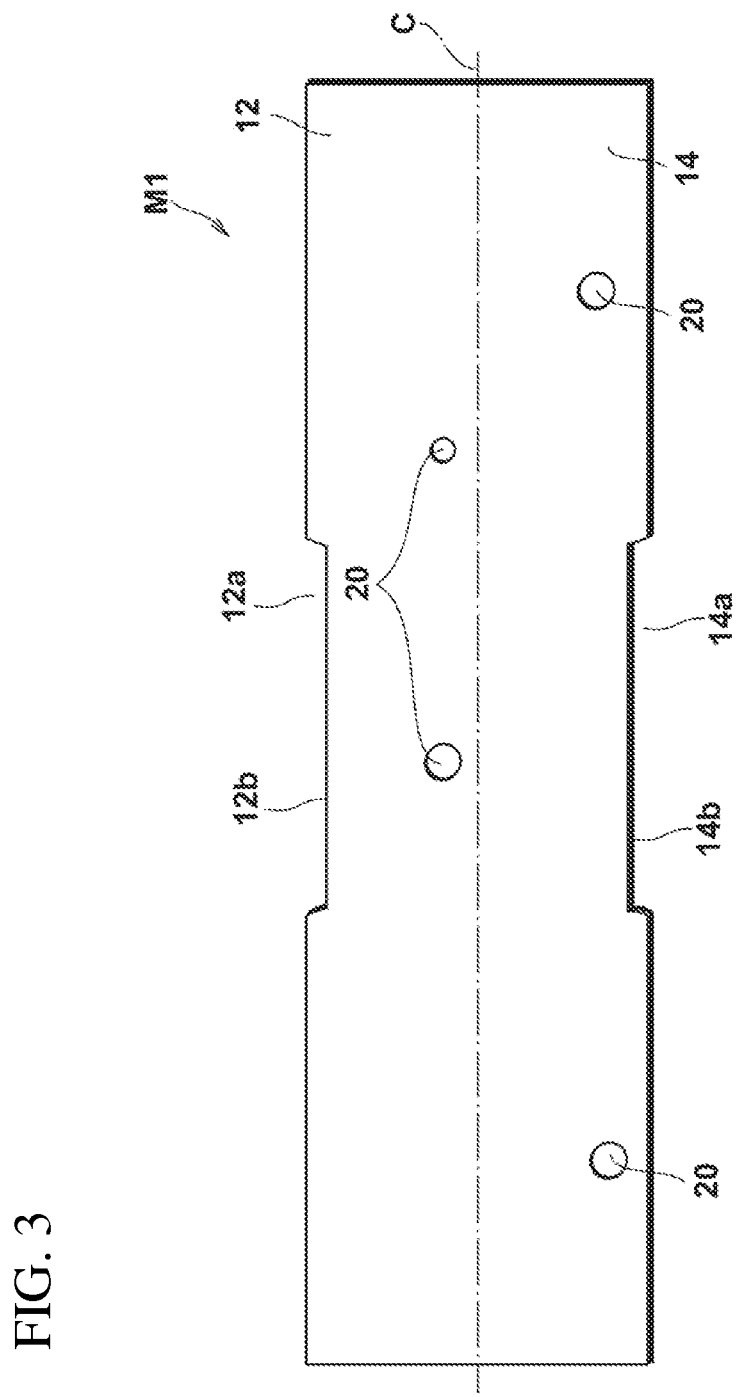
FIG. 3 is a plan view of a first premolded body that corresponds to an expanded shape of the beam main body of the beam member according to the embodiment.

FIG. 3 is a plan view of a first premolded body that corresponds to an expanded shape of the beam main body of the beam member according to the present embodiment. FIG. 4A is a cross-sectional diagram in which a lower die and an upper die are open at a final step of molding the beam main body of the beam member according to the present embodiment. FIG. 4B is a cross-sectional diagram in which the lower die and the upper die are closed at the final step shown in FIG. 4A. FIGS. 4A and 4B positionally correspond to a cross-sectional diagram obtained by rotating the cross-sectional diagram of FIG. 2A so that a slit portion is placed upward on the same cross-section as that of FIG. 2A.

As shown in FIG. 3, to mold the beam main body 10, a first premolded body M1 is prepared first. Such a first premolded body M1 is formed as follows. That is, a rectangular plate formed of metal such as iron or aluminum is blanked so that the contour shape thereof has the first half-slit portion 12a and the second half-slit portion 14a that are a pair of opposing cutout concave portions formed by cutting out the one end portion 12 and the other end portion 14 correspondingly. The plate is then pierced so that the inside of the contour thereof includes the holes 20.

Because the first half-slit portion 12a and the second half-slit portion 14a are formed by blanking a plate, unnecessary deformation or an unnecessary burr are not generated in a vertical direction of a plate surface, and end surfaces 12b and 14b are also molded by being precisely punched out as a surface vertical to the plate surface. Because the holes 20 are formed by piercing a plate, the holes 20 are formed without any unnecessary deformation or burr in the vertical direction of the plate surface, so that mounting of other members on the beam main body 10 serving as a final molded body, entering of a paint into the beam main body 10, draining, and the like are successfully realized. An appropriate angle R is applied to each corner portion of the first half-slit portion 12a and the second half-slit portion 14a to prevent unnecessary stress concentration.

Next, as shown in FIG. 4A, a second premolded body M2 obtained by appropriately performing bending molding on such a first premolded body M1 is prepared. Such a second premolded body M2 is then accommodated in a pressing die 100 that is constituted by a lower die 102 and an upper die 104 that opposes the lower die 102 and is movable in an up-and-down direction.

The lower die 102 includes an accommodating portion 102a having an accommodating surface that fits the shape of a half of an outer surface of the beam main body 10 serving as a final molded body. The upper die 104 includes an accommodating portion 104a having an accommodating surface that fits the shape of the other half of the outer surface of the beam main body 10 serving as a final molded body and a convex portion 104b that protrudes from the accommodating surface. Such a convex portion 104b extends also in a direction vertical to the diagram of FIG. 4A, and the contour shape thereof is set so as to fit the shape of the slit portion 16 of the beam main body 10 serving as a final molded body and to be capable of pressing the end surface 12b of the first half-slit portion 12a and the end surface 14b of the second half-slit portion 14a with a predetermined pressing margin. At this time, only about a half of the second premolded body M2 is placed on the accommodating portion 102a of the lower die 102. Meanwhile, the upper die 104 is positioned to be upwardly spaced away from the second premolded body M2 and the lower die 102 while opposing the second premolded body M2 and the lower die 102.

Next, as shown in FIG. 4B, the upper die 104 is lowered toward the second premolded body M2 placed on the lower die 102 and the lower die 102. At this time, the second premolded body M2 is pressed against the accommodating portion 102a of the lower die 102 and gradually accommodated in the accommodating portion 104a of the upper die 104, so that the end surface 12b of the first half-slit portion 12a and the end surface 14b of the second half-slit portion 14a in the second premolded body M2 abut against the convex portion 104b provided in the accommodating portion 104a of the upper die 104.

In such a state, when the upper die 104 is further lowered to completely press the lower die 102, an outer surface of the second premolded body M2 is pressed against the respective accommodating surfaces of the accommodating portion 102a of the lower die 102 and the accommodating portion 104a of the upper die 104, and the end surface 12b of the first half-slit portion 12a and the end surface 14b of the second half-slit portion 14a in the second premolded body M2 are pressed against the convex portion 104b provided in the accommodating portion 104a of the upper die 104. The second premolded body M2 is pressed in such a way.

At this time, the outer surface of the second premolded body M2 is continuously pressed in a radial direction of the second premolded body M2, while being held by the respective accommodating surfaces of the accommodating portion 102a of the lower die 102 and the accommodating portion 104a of the upper die 104. Meanwhile, the end surface 12b of the first half-slit portion 12a and the end surface 14b of the second half-slit portion 14a in the second premolded body M2 are continuously compressed in a circumferential direction of the second premolded body M2 while respectively abutting against the convex portion 104b provided in the accommodating portion 104a of the upper die 104. Because the size of the first half-slit portion 12a is set to be equal to that of the second half-slit portion 14a, the end surface 12b of the first half-slit portion 12a and the end surface 14b of the second half-slit portion 14a are continuously compressed equally in the circumferential direction of the second premolded body M2 while equally abutting against the convex portion 104b.

Because the end surface 12b of the first half-slit portion 12a and the end surface 14b of the second half-slit portion 14a are molded by being precisely punched out as a surface vertical to the plate surface of the second premolded body M2, the respective end surfaces 12b and 14b are continuously compressed equally and reliably in the circumferential direction of the second premolded body M2. Correspondingly, the second premolded body M2 is continuously and reliably pressed by the respective accommodating surfaces of the accommodating portion 102a of the lower die 102 and the accommodating portion 104a of the upper die 104 to show plastic deformation along the shape of the respective accommodating surfaces without any unnecessary deformation and the like.

When the second premolded body M2 is kept in such a state for a predetermined period of time, the second premolded body M2 shows required plastic deformation to be molded into the beam main body 10 serving as a final molded body having the slit portion 16 and the holes 20 being formed therein, respectively. At this time, the end surface 12b corresponds to the upper-edge end surface 16a of the slit portion 16 and the end surface 14b corresponds to the lower-edge end surface 16b of the slit portion 16.

The upper die 104 is then raised and the beam main body 10 is taken out of the pressing die 100. The bracket member 50 that is molded and prepared in advance is positioned with respect to the beam main body 10 to abut against the beam main body 10. The remaining portions of the one end portion 12 and the other end portion 14 of the beam main body 10 other than the slit portion 16 abut to each other to be welded to each other correspondingly by the first welding portion 18a and the second welding portion 18b. The bracket member 50 is welded to the outer surface of the beam main body 10 by the rear welding portion 58a and the front welding portion 58b. In this way, the beam member 1 that includes the beam main body 10 and the bracket member 50 can be obtained.

According to the present embodiment, to successfully satisfy all of strength, rigidity, layout property, and workability, while the beam main body 10 is preferably molded by cylindrically rolling a plate-shaped member by pressing, the present invention is not limited thereto. As long as such conditions are appropriately satisfied, the beam main body 10 can be a cylindrical beam main body molded by rolling a plate-shaped member into an elliptical shape, a rectangular cylindrical shape, or the like, or can be a cylindrical beam main body having these cylindrical shapes being appropriately combined with each other, although the configuration of a die becomes complicated. While the beam main body 10 has the linear central axis C and extends in the right-and-left direction straightly, the present invention is not limited thereto. The beam main body 10 can be appropriately bent on the right and left sides of the slit portion 16 to extend in the right-and-left direction. A modification of the present embodiment in which a rectangular cylindrical portion is combined with a cylindrical beam main body is explained in detail below with reference to FIGS. 5A to 7B.

FIG. 5A is a perspective view of a beam member according to the present modification. FIG. 5B is a perspective view of a beam main body of the beam member according to the present modification. FIG. 6A is a cross-sectional diagram along C-C of FIG. 5A and FIG. 6B is a cross-sectional diagram along D-D of FIG. 5A. FIG. 7A is a cross-sectional diagram in which a lower die and an upper die are open at a final step of molding the beam main body of the beam member according to the present modification. FIG. 7B is a cross-sectional diagram in which the lower die and the upper die are closed at the final step shown in FIG. 7A.

A beam member 1' according to the present modification that is shown in detail with reference to FIGS. 5A to 6B is mainly different from the beam member according to the present embodiment in that the beam member 1' includes a concave portion 30 formed by depressing apart of a cylindrical portion of a beam main body 10' and the concave portion 30 has a rectangular cylindrical shape. The remaining configuration is the same as that of the present embodiment. Therefore, in the present modification, explanations are made while focusing on the difference, and identical constituent elements are denoted by like reference characters and explanations thereof are appropriately simplified or omitted.

Specifically, the concave portion 30 formed by depressing a part of the cylindrical portion of the beam main body 10' includes a rectangular cylindrical portion 34 that is connected via a pair of connecting portions 32 to the cylindrical portion. That is, the rectangular cylindrical portion 34 is smoothly connected via the pair of connecting portions 32 to the cylindrical portion. In such a concave portion 30, the slit portion 16, a welding portion such as the first welding portion 18a, and the bracket member 50 can extend along the shape of the connecting portions 32 and the rectangular cylindrical portion 34.

As shown in FIGS. 7A and 7B, to form such a concave portion 30, it suffices that a pressing die 100' that includes a lower die 102' and an upper die 104' having corresponding rectangular concave-shaped accommodating portions 102a' and 104a' being formed therein is used, and after a second premolded body M3 is accommodated in the pressing die 100' by the same manner as that of FIG. 4A, the upper die 104' is lowered to completely press the lower die 102' by the same manner as that of FIG. 4B.

When the lower die 102' and the upper die 104' in which the rectangular concave-shaped accommodating portions 102a' and 104a' are formed over the entire pressing die 100' are used, a beam member having a beam main body of an entirely rectangular cylindrical shape is naturally obtained.

Figure 8:
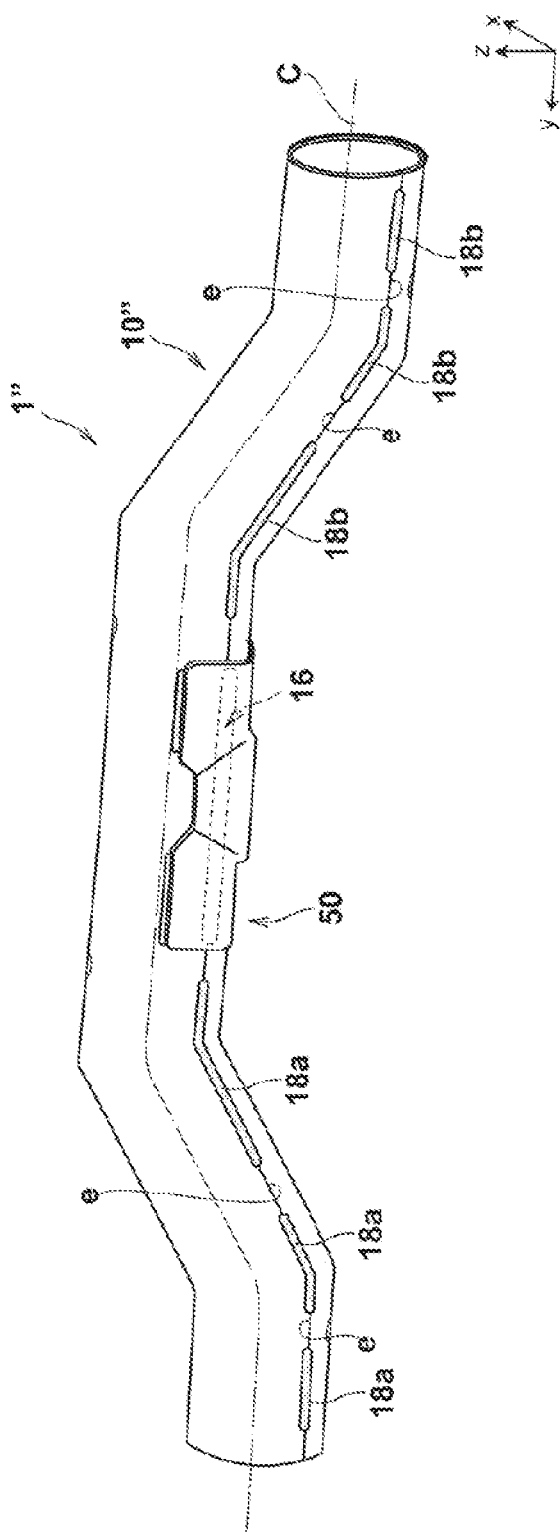
FIG. 8 is a perspective view of a beam member according to another modification of the present embodiment.

When the central axis C of the pressing dies 100 and 100' and the like is curved, a beam member 1'' that is curved correspondingly as shown in FIG. 8 is naturally obtained.

FIG. 8 is a perspective view of a beam member according to another modification of the present embodiment.

As shown in FIG. 8, the beam member 1'' according to the present modification is different from the beam member 1 according to the present embodiment in that along with a curve of the central axis C, the shape of a cylindrical beam main body 10" is also curved at y-axis direction ends. Because the remaining configuration is the same as that of the beam member 1 according to the present embodiment, only principle reference numerals are shown in FIG. 8. Such a beam member 1" can be manufactured by using the pressing die 100 having curved ends of a cavity in an axial direction thereof. The entire beam main body 10" of the beam member 1" or a portion thereof can be formed in a rectangular cylindrical shape. Naturally, such a shape can be manufactured by using the pressing die 100' having curved ends of a cavity in an axial direction thereof and the like.

In the present invention, the shapes, arrangements, and numbers of constituent elements are not limited to those described in the above embodiments, and it is needless to mention that changes can be appropriately made without departing from the scope of the invention, such as replacing these constituent elements with other elements having equivalent operational effects.

INDUSTRIAL APPLICABILITY

As explained above, according to the beam member of the present invention, it is possible to provide a beam member serving as a strength member that can achieve further weight reduction and further cost reduction with high shape precision while simplifying an attachment step of other components while design flexibility is increased. Therefore, because of its general purposes and universal characteristics, applications of the present invention are expected in a wide range in the field of a strength member of a movable body such as an automobile.

The invention claimed is:

1. A beam member for a vehicle comprising:
   a cylindrical beam main body that is formed by rolling a plate-shaped member;
   a first end portion and a second end portion of the beam main body in which respective end surfaces oppose and partially abut to each other in a circumferential direction of the beam main body;
   a slit portion of the beam main body formed by a gap between the first and second end portions at a central portion of the beam main body in an axial direction of the beam main body;
   a first welded portion and a second welded portion of the beam main body that join abutting portions of the respective end surfaces of the first end portion and the second end portion to each other so as to sandwich the slit portion therebetween in the axial direction; and
   a bracket member that straddles the first end portion and the second end in the circumferential direction to be welded to an outer surface of the beam main body so as to cover the slit portion between the first welded portion and the second welded portion in the axial direction.

2. The beam member according to claim 1, wherein the slit portion is defined by causing a first half-slit portion that is formed on the first end portion to cooperating with a second half-slit portion that is formed on the second end portion and has a size equal to that of the first half-slit portion.

3. The beam member according to claim 2, wherein the first half-slit portion and the second half-slit portion are formed together in the plate-shaped member before the plate-shaped member is rolled.

4. The beam member according to claim 1, wherein the bracket member covers entirely the slit portion.

5. The beam member according to claim 1, further comprising a plurality of holes, wherein the holes are formed together in the plate-shaped member before the plate-shaped member is rolled.

6. The beam member according to claim 2, wherein the bracket member covers entirely the slit portion.

7. The beam member according to claim 3, wherein the bracket member covers entirely the slit portion.

8. The beam member according to claim 2, further comprising a plurality of holes, wherein the holes are formed together in the plate-shaped member before the plate-shaped member is rolled.

9. The beam member according to claim 3, further comprising a plurality of holes, wherein the holes are formed together in the plate-shaped member before the plate-shaped member is rolled.

10. The beam member according to claim 4, further comprising a plurality of holes, wherein the holes are formed together in the plate-shaped member before the plate-shaped member is rolled.

* * * * *